No. 778,816. PATENTED DEC. 27, 1904.
M. WIKSTROM & A. C. MORSE.
APPARATUS FOR MAKING TUBES.
APPLICATION FILED SEPT. 18, 1903.

6 SHEETS—SHEET 1.

WITNESSES
INVENTORS

No. 778,816. PATENTED DEC. 27, 1904.
M. WIKSTROM & A. C. MORSE.
APPARATUS FOR MAKING TUBES.
APPLICATION FILED SEPT. 18, 1903.
6 SHEETS—SHEET 2.
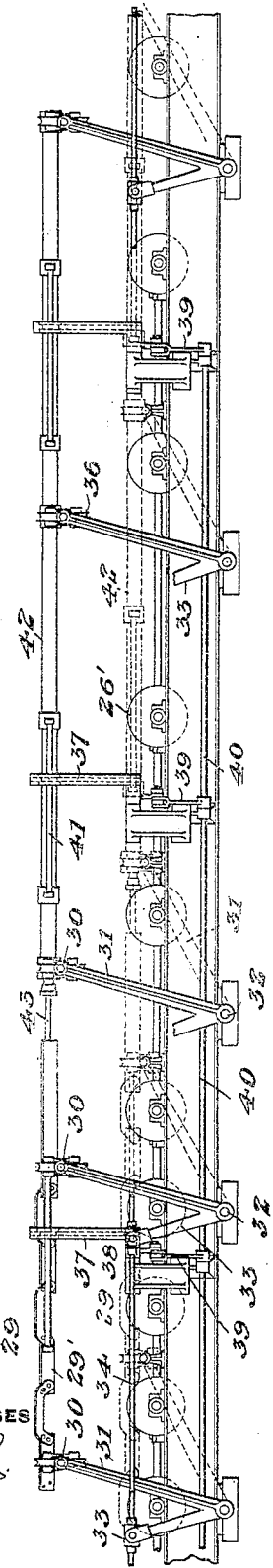
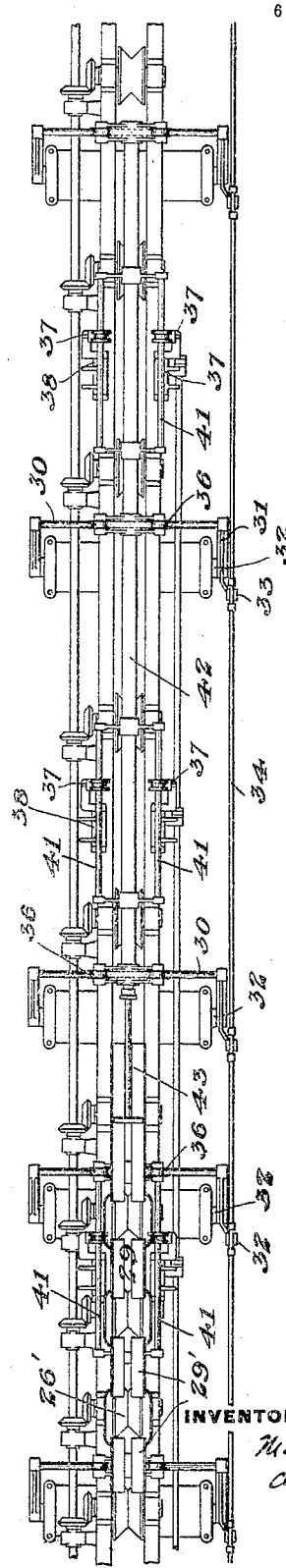

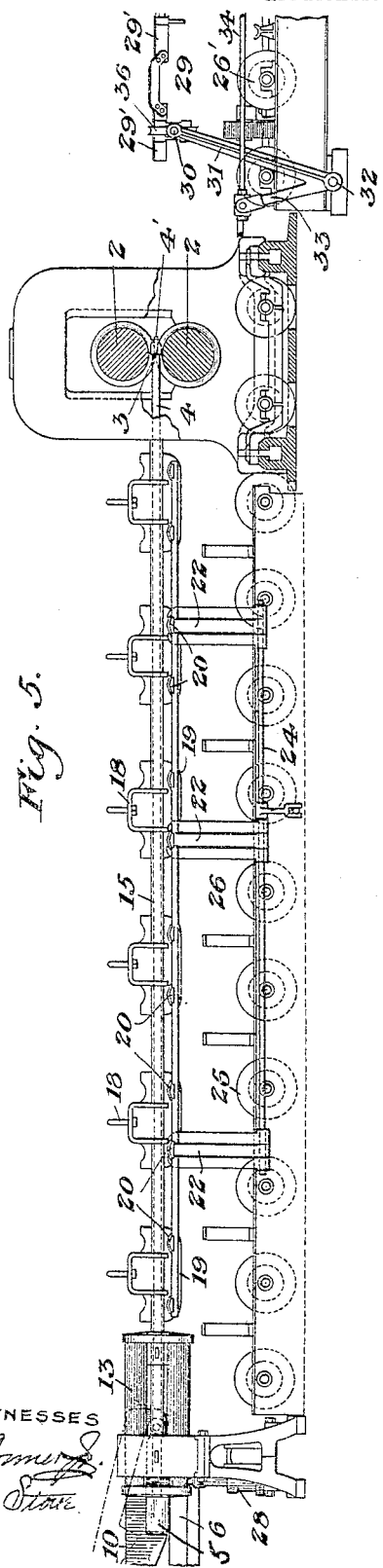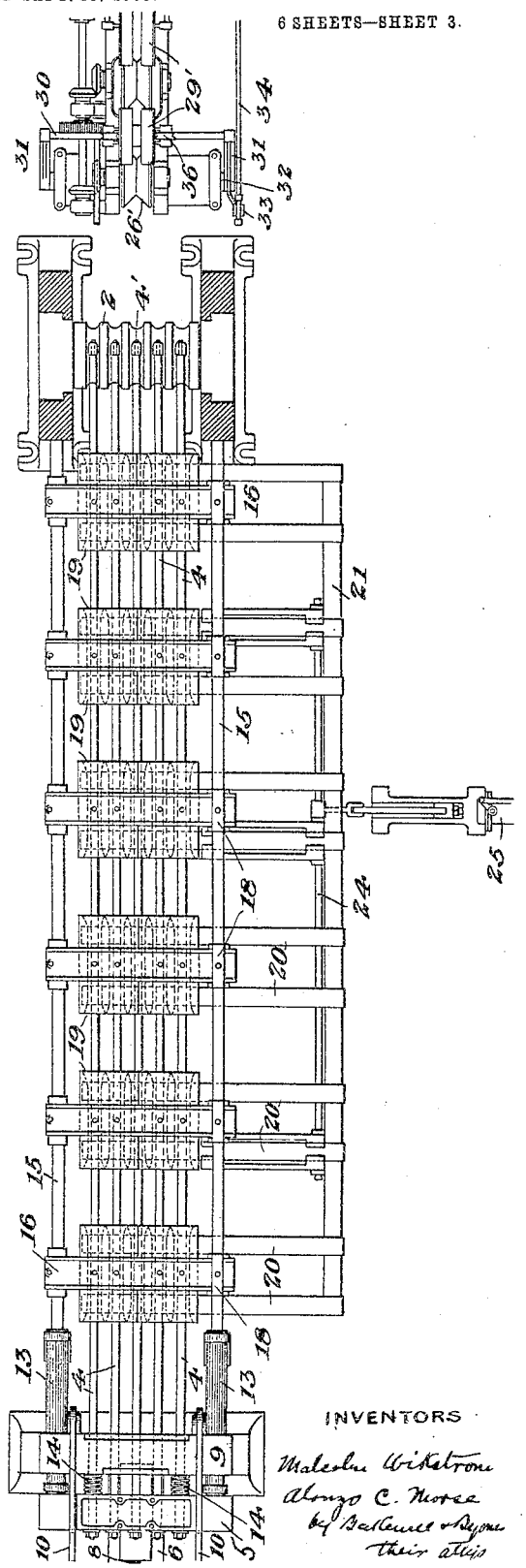

No. 778,816. PATENTED DEC. 27, 1904.
M. WIKSTROM & A. C. MORSE.
APPARATUS FOR MAKING TUBES.
APPLICATION FILED SEPT. 18, 1903.

6 SHEETS—SHEET 4.

WITNESSES

INVENTORS

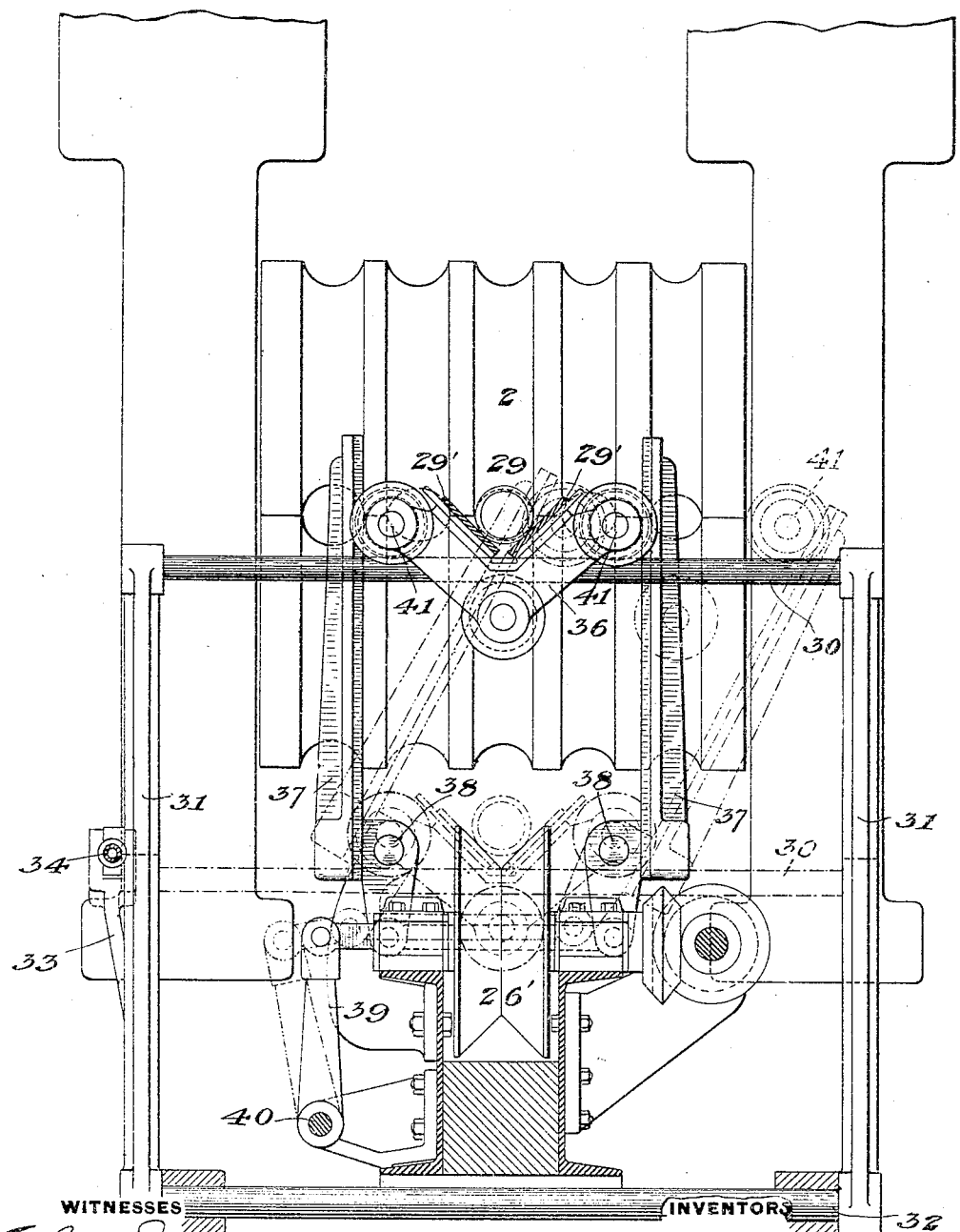

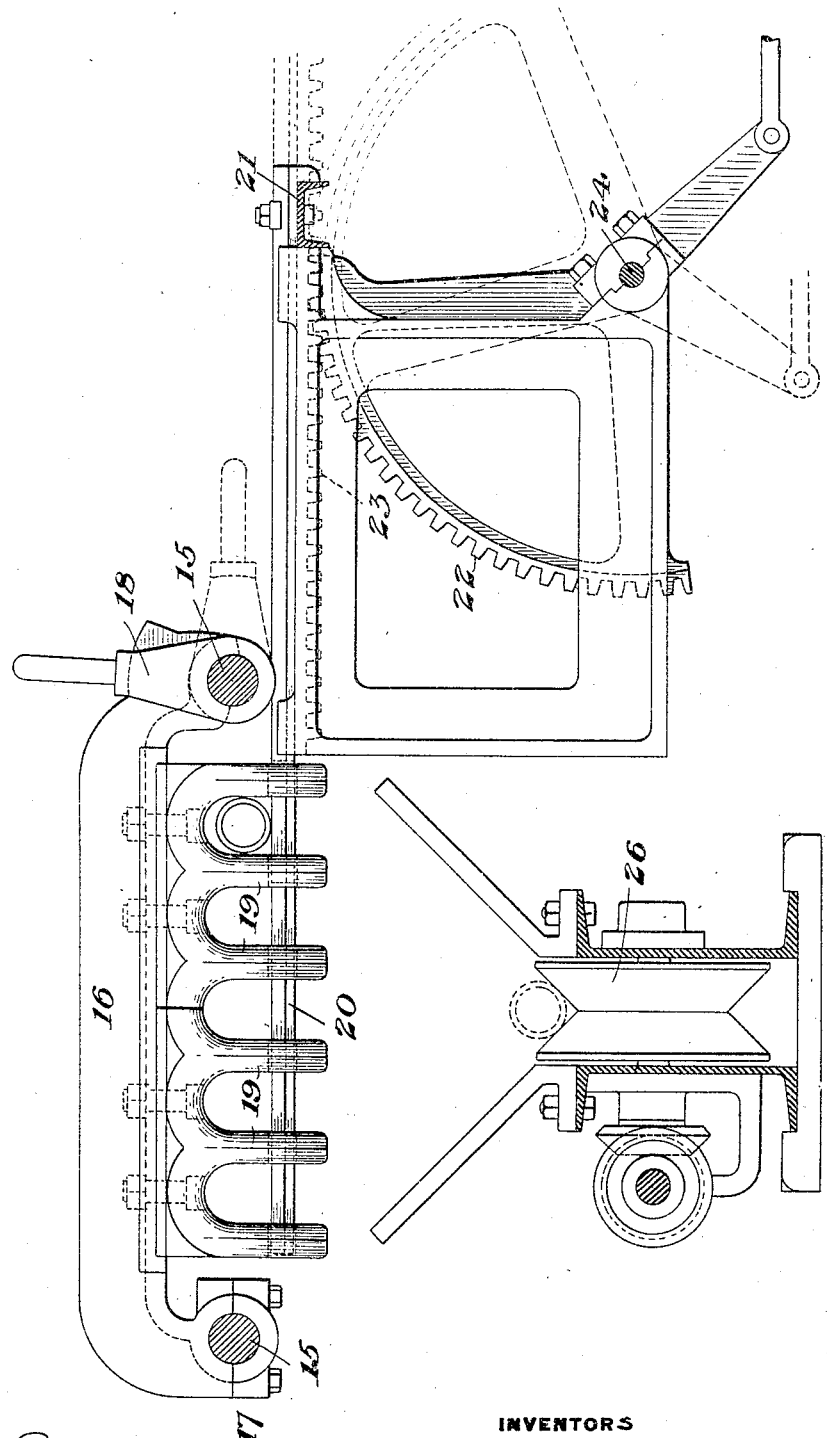

No. 778,816. Patented December 27, 1904.

UNITED STATES PATENT OFFICE.

MALCOLM WIKSTROM AND ALONZO C. MORSE, OF SHELBY, OHIO, ASSIGNORS TO SHELBY STEEL TUBE COMPANY, OF SHELBY, OHIO, A CORPORATION OF NEW JERSEY.

APPARATUS FOR MAKING TUBES.

SPECIFICATION forming part of Letters Patent No. 778,816, dated December 27, 1904.

Application filed September 18, 1903. Serial No. 173,647.

*To all whom it may concern:*

Be it known that we, MALCOLM WIKSTROM and ALONZO C. MORSE, of Shelby, in the county of Richland and State of Ohio, have invented a new and useful Apparatus for Making Tubes, of which the following is a full, clear, and exact description, reference being had to the accompanying drawings, forming part of this specification, in which—

Figure 1:
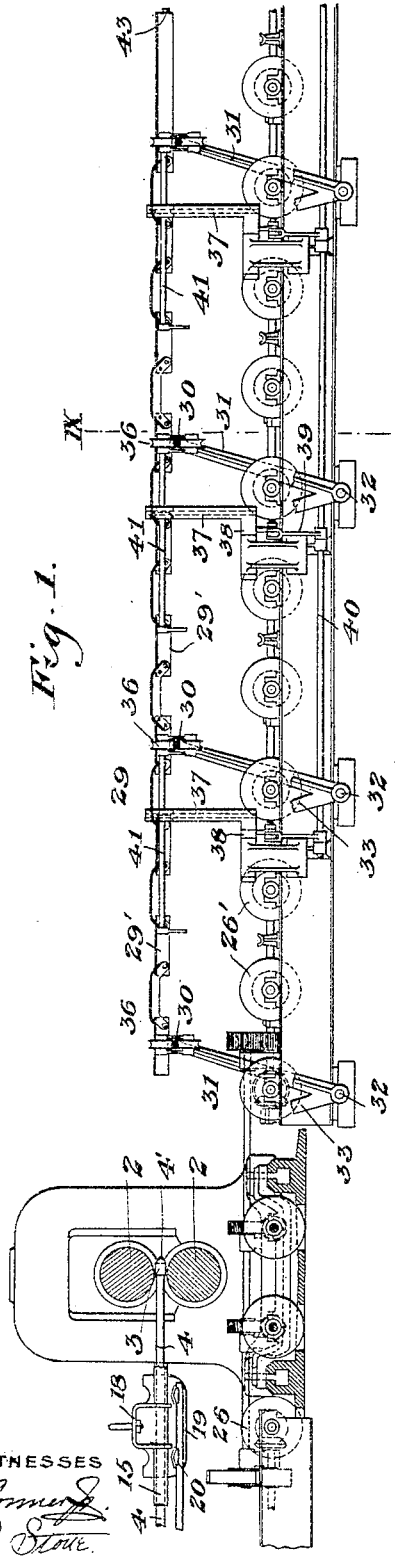
Figure 2:
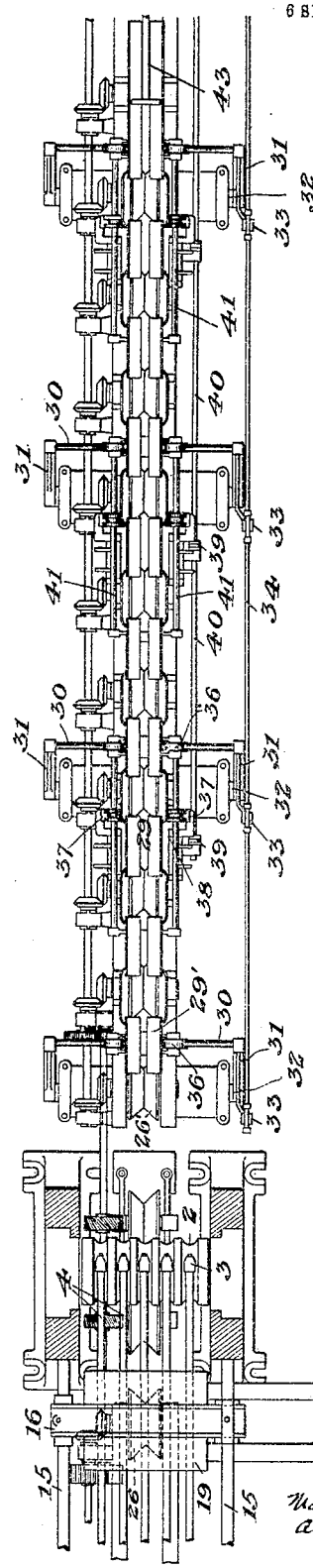
Figure 7:
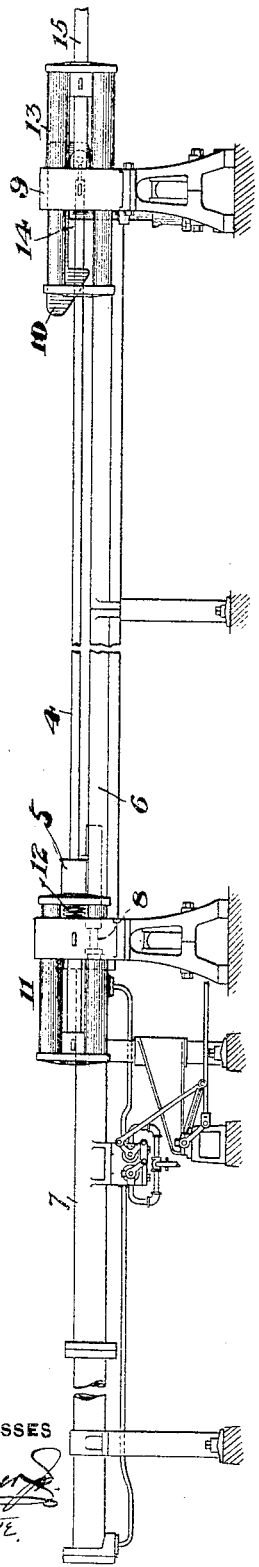
Figure 8:
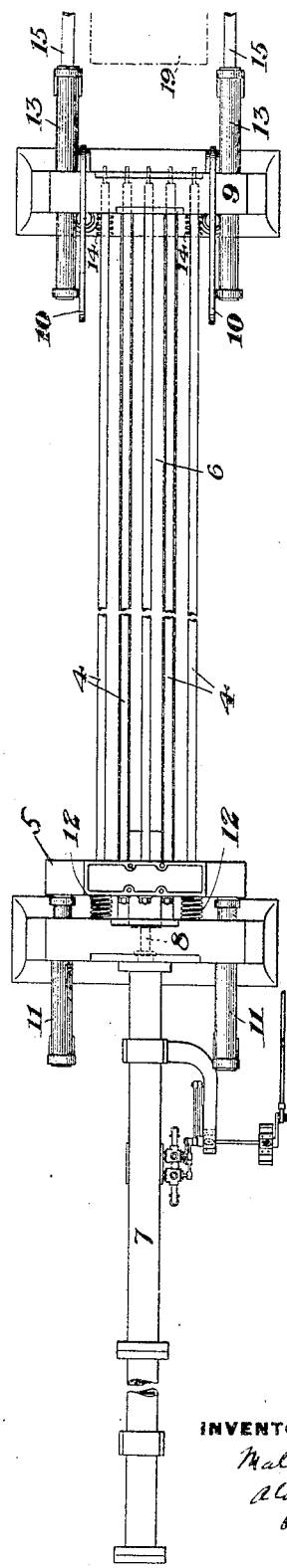

Figure 1 is a side elevation, partly in section, showing the mill with a portion of the receiving-table adjacent thereto. Fig. 2 is a top plan view, partly in section, of Fig. 1. Fig. 3 is a side elevation showing the outer end portion of the receiving-table. Fig. 4 is a top plan view of Fig. 3. Fig. 5 is a view similar to Fig. 1, but showing the mandrel side. Fig. 6 is a top plan view, partly in section, of Fig. 5. Fig. 7 is a side elevation showing the outer end portion of the mandrel mechanism. Fig. 8 is a top plan view of Fig. 7. Fig. 9 is a cross-section on the line IX IX of Fig. 1 on a larger scale, and Fig. 10 is a cross-section on a larger scale of the mandrel-supports and operating mechanism.

Heretofore in the manufacture of seamless tubing difficulty has been experienced when it has been attempted to roll tubes of more than a certain small length, and generally the maximum length which it has been convenient to roll has been about ten to twelve feet with tubing of three-inch diameter and less. This limits greatly the range of application of these tubes, since when it is desired to use tubing of greater length than can be rolled in a single piece it has been necessary to elongate it by cold-drawing or to unite two or more pieces.

The object of our invention is to provide means by which tubes can be made of greater length by hot-rolling than heretofore, with a great saving of labor and time as compared with the means heretofore employed.

Our invention comprises improvements in the mechanism employed on both sides of the rolls—namely, an improved construction by which the tube when delivered from the rolls can be rapidly and without manual labor freed from the mandrel-rods and delivered automatically to a conveyer, which transfers it to the receiving side of the rolls and by which the rods are automatically restored to rolling position, and improved mechanism by which the tubes on the receiving side of the rolls are mechanically transferred opposite to the desired pass and delivered thereinto also without manual labor.

In the drawings, 2 2 are the rolls by which the tubular blank formed as in the ordinary practice by a preceding operation is rolled and elongated, these rolls being provided with a series of passes of successively smaller diameter, through which the tube is passed in succession over mandrels 3, removably supported on mandrel-rods 4 on the delivery side of the rolls. There are several of these rods, one being provided for each pass of the rolls. They are connected at the rear end to a reciprocatory cross-head 5, which is mounted on suitable slideways 6 and is adapted to be moved toward and from the rolls by a motor, preferably a pneumatic cylinder 7, the piston-rod 8 of which is connected to the cross-head.

The mandrel-rods 4 4 extend parallel to each other through a guiding-yoke 9, which is at a distance from the rolls nearly equal to the length of the rods, so that when the cross-head 5 is advanced to its full extent by the cylinder 7 the ends of the mandrel-rods shall reach within the passes of the rolls in position to receive the mandrels upon their reduced end portions 4', which are preferably employed for holding the mandrel detachably. When in this advanced position, as shown in Fig. 5, the rods are held against longitudinal motion by suitable stop mechanism, consisting, preferably, of locks or hooks 10 10, which are pivoted to the yoke and are beveled at their ends, so that when the cross-head approaches the yoke it will automatically rise and pass beneath them, whereupon they will drop by gravity back of the cross-head and will hold it, opposing resistance to the rearward force applied to the rods during the rolling operation. When the cross-head is thus advanced and is held by the hooks, the tube to be rolled is passed through one of the passes of the rolls over the mandrel and upon the mandrel-rod, passing forward from the rolls and traveling along the rod. To free the tube from the rod when it has emerged from the rolls, the hooks 10 are disengaged from the cross-head and the cross-head is retracted by its cylinder 7 into the position shown in Fig. 8, thus drawing the rods back through the yoke and stripping from the tube the rod over which the tube has been delivered. The tube then being freed by abutting endwise against the yoke drops by gravity upon a conveyer described below and is transferred to the receiving side of the rolls ready to be passed therethrough, or if it has already been passed through the rolls a sufficient number of times it can be delivered from the mill to the finishing-department.

It is desirable to move the cross-head backward and forward very rapidly in order to economize time, and to cushion the cross-head at the end of such rapid travel we prefer to employ cushioning mechanism, the preferable form of which is shown in the drawings. At the end of the cylinder 7 are spring-cushioning cases 11, with which the cross-head engages when it reaches the end of its rearward or stripping motion, and these may be supplemented by springs 12. To cushion the cross-head at the end of its forward motion, we employ similar spring-cushions 13 and springs 14.

To insure a perfect grip of the rolls upon the tube when the latter is fed to the rolls, we employ the following arrangement: When the cross-head is advanced, the pressure of the air is maintained in the cylinder 7, so as to force the cross-head against the springs 14, and thus to project the ends of the mandrel-rods slightly beyond their normal rolling position. There is a clearance between the hooks 10 and the cross-head, allowing the mandrel-rod and mandrel when engaged by the tube to recede in the pass for a very short distance. This avoids the difficulty which has been had heretofore in entering the tube into the rolls. An additional aid in entering the tube is afforded by the pusher which we describe below.

The yoke 9 is tied to the roll-housings by tie-rods 15, which bind these parts of the structure firmly together. At intervals along these rods are rod-supports constructed so as to support the rods and keep them from bending and to permit the removal of the tube. For this purpose these supports are preferably constructed as shown in Fig. 10, and each comprises a frame or bar 16, pivoted at 17 to one of the tie-rods 15 and extending transversely to the opposite tie-rod, to which it can be held detachably by a pivoted lock or hook 18. The reason for pivoting the frame 16 is to enable it to be raised in case the tube by accident should stick in the rod-support. Guide-shoes 19, open at their lower ends, are secured to the frame 16 and are adapted to register with the mandrel-rods, which respectively pass through the opening of the shoes. To uphold the tube and mandrel-rod, we employ bars 20, which are preferably connected together by a bar 21, so as to constitute a rack. These bars 20 extend horizontally across and under the path of the mandrel-rods and are adapted to be retracted and be advanced by suitable mechanism, preferably by a segmental gear 22, meshing with a rack 23 and operated through a shaft 24, actuated by a cylinder 25.

Beneath the mandrel-rods and between the yoke 9 and the rolls is a conveying-table composed, preferably, of driven rollers 26 and having diverging receiving-fingers which span the width of the series of mandrel-rods, so that a tube when dropped from any of the rods will be delivered by the fingers upon the rollers of the conveying-table, which extend past and preferably under the roll-housing to the receiving side of the mill.

As the tube is delivered by the rolls upon the mandrel-rod it passes along the latter within the opening of the rod-supports, with which the rod is in register, and the support afforded thereby to the rod and tube both laterally and vertically holds it from bending, while permitting free passage of the tube. When the tube has been delivered by the rolls, the operator opens the valve of the cylinder 7, which is also connected with the lifting-cylinders 28, placed under the hooks 10, so that the air entering the latter cylinders raises the hooks and frees the cross-head, which is then quickly retracted by the cylinder 7, stripping the mandrel-rod from the tube and leaving the tube supported only by the bars 20 within the rod-supports. The operator then actuates the cylinder 25 and retracts the bars 20, whereupon the tube will drop freely from the rod-support upon the conveying-table 26. All the supporting-bars 20 are retracted at once, and the tube is thus freed simultaneously from each of its supports. It will therefore drop directly upon the conveying-table, preserving its horizontal position, whereas if freed at one part sooner than at another it would be apt to bend by reason of one end striking the conveying-table in advance of the other.

It will thus be seen that the placing of the mandrel and mandrel-rods in position, the withdrawing of them from the tube, and the delivery of the tube upon the conveying-table are accomplished without handling of the tube or of the rods. The operation is therefore not dependent upon the ability of workmen to manage these parts, but by making the apparatus of the desired size it will successfully deal with tubes of any length that can be rolled from the original billet.

The skilled mechanic will be able to modify the apparatus which I have described above.

The kind of motors employed, the construction and arrangement of the rod-supports, the cushioning devices, and the locking device which holds the mandrel-rods during the rolling operation may all be modified in many ways.

We will now describe the mechanism which we employ on the receiving side of the rolls for transferring the tube to the desired roll-pass and entering it therein. This mechanism comprises an upwardly and laterally movable feed-table and a pusher which moves with the table so that it will be in line with the end of the tube at any pass to which the tube is moved, and that it will also serve as a stop for the tube when it is delivered to the table from the opposite side of the rolls.

As above stated, the conveying-table 26 extends back past and preferably under the roll-housings to the receiving side of the rolls, where it is indicated by the numeral 26'. A lifting-table 29 is constituted by a series of trough-sections 29', connected together and adapted when in their lowered or receiving position to rest between the rollers of the table 26' below the path of the tube as it is moved on said table. This lifting-table is supported at intervals upon cross rails or tracks 30, which are mounted upon lifting-levers 31, pivoted at 32 and adapted to be rocked by crank-arms 33, which are connected by a rod 34 and may be moved by a cylinder, so that as these levers 31 are rocked they will lift the table 29 vertically from the position below the rollers 26' to the position shown in Fig. 3 at the level of the roll-passes. The lateral motion of the lifting-table 29' is provided for by supporting it on slides or wheeled trucks 36 on the cross-tracks 30 and by providing parallel guide-fingers 37, which are pivoted at 38 on opposite sides of the rollers 26' and are adapted to be rocked together without disturbing their parallel relation by rocking-levers 39, which are actuated from the shaft 40, connected with a cylinder or other suitable motor. The guide-fingers 37 bear against or are connected slidingly to longitudinal slide-bars 41 on the lifting-table, and as they are rocked from one side to the other, as indicated by dotted lines in Fig. 9, they will move the lifting-table on the cross-tracks 30 so as to bring it to the vertical plane of any of the roll-passes, and when the fingers are so moved, if the table is in its lowered position, the table when elevated will be guided by these fingers so that when raised it will be exactly in line with the desired roll-pass, and when the table is again lowered by motion of the levers 31 the fingers 37 will always guide it so as to restore it exactly to the desired position in the line of the conveying-rollers 26'. At the rear end of the lifting-table 29 is a pusher-cylinder 42, supported in like manner as the table by lifting-levers 31, which are connected with and move in harmony with the lifting-levers of the table, so that the pusher-cylinder will always be in line with the table in every position of the latter whether at the lower receiving position or in the elevated delivering position. The operation of these parts is as follows: When the tube is returned from the delivering side of the rolls upon the table 26' on the receiving side, the lifting-table 29 and the pusher-cylinder 42 are in their lower position, the lifting-table being below the rollers 26' and the plunger 43 of the pusher-cylinder being at the level of the rollers. As the tube passes rapidly along the rollers 26' it is engaged and stopped by the end of the pusher-plunger 43, which can be projected by the workman so as to stop the tube in the proper position, according to the length of the same. The lifting-table 29 is then elevated, the guiding-fingers 37 being adjusted laterally, as above explained, so as to guide the table into line with the desired roll-pass. The mandrel having been placed upon or against the end of the mandrel-rod in the pass of the rolls, the pusher 43 is then projected by actuation of the cylinder 42 so as to engage the end of the tube and push it forward upon the mandrel and into the rolls. When the tube has been drawn through the rolls clear of the lifting-table, the table is again lowered into receiving position ready to receive the tube when next returned by the table 26.

It is preferable to connect the valve which actuates the lifting mechanism of the table 29 with the valve which actuates the cylinder 7 for retracting the mandrel-rod, so that these cylinders will operate in unison and that simultaneously with the retraction of the mandrel-rod the table will be lowered to receiving position and simultaneously with the advance of the mandrel-rods the table will be elevated to delivering position. The skilled mechanic may also modify the construction of the apparatus on the receiving side of the rolls in many ways without departing from the principle of our invention as defined in our claims.

We claim—

1. In apparatus for rolling tubes, the combination of a rod for receiving the tube from the rolls, means for withdrawing the rod from the tube while the latter remains in the place in which it is delivered by the rolls, and mechanism for returning the tube to the receiving side of the rolls and into line with a pass of the rolls, substantially as described.

2. In apparatus for rolling tubes, the combination of a rod for receiving the tube from the rolls, means for stripping the rod from the tube, a conveyer below the initial position of the rod for returning the tube to the receiving sides of the rolls, and a transfer device for lifting the tube from the conveyer into line with a pass of the rolls, substantially as described.

3. In apparatus for rolling tubes, the combination of a rod for receiving the tube from the rolls, means for stripping the rod from the tube while the latter remains in the place in which it is delivered by the rolls, a support for receiving the tube, and means for withdrawing the support from the tube, substantially as described.

4. In apparatus for rolling tubes the combination of a series of rods extending from several passes of the rolls, means for freeing the tube from its rod, a conveyer beneath the rod for delivering the tube to the receiving side of the rolls and means for dropping the tube upon the conveyer; substantially as described.

5. In apparatus for rolling tubes, the combination of a rod for receiving the tube from the rolls, means for stripping the rod from the tube while the latter remains in the place in which it is delivered by the rolls, a support for receiving the tube, means for withdrawing the support from the tube, and a conveyer upon which the tube can drop, substantially as described.

6. In apparatus for rolling tubes, the combination of rolls, means for stripping the rod from the tube while the latter remains in the place in which it is delivered by the rolls, a plurality of supports for the stripped tube and means for simultaneously removing the supports from beneath the tube; substantially as described.

7. In apparatus for rolling tubes, the combination of a rod for receiving the tube from the rolls, a stripper, a horizontally-movable support below the tube and means for withdrawing the support to drop the tube; substantially as described.

8. In apparatus for rolling tubes, the combination of a rod for receiving the tube from the rolls, means for stripping the rod from the tube while the latter remains in the place in which it is delivered by the rolls, a supporting device arranged to limit the transverse movement of the rod in each direction, and means for releasing the supporting device from the tube, substantially as described.

9. In apparatus for rolling tubes, the combination of a rod for receiving the tube from the rolls, a stripper, adapted to strip the rod from the tube while the latter remains in the place in which it is delivered by the rolls, a supporting device for the stripped tube, and means for releasing the support to drop the tube; substantially as described.

10. In apparatus for rolling tubes, the combination of a rod for receiving the tube from the rolls, and an encircling rod-support provided with a removable bottom piece; substantially as described.

11. In apparatus for rolling tubes the combination of a series of rods for receiving the tubes from the rolls, rod-supports arranged in line encircling the several rods and provided with horizontally-removable bottom pieces; substantially as described.

12. In apparatus for rolling tubes, the combination with a rod for receiving the tube from the rolls, and a series of encircling guides for the rod provided with removable bottom pieces; substantially as described.

13. In apparatus for rolling tubes, the combination of a rod for receiving the tube from the rolls, and a series of encircling guides for the rod provided with removable bottom pieces connected together and having means for removing them simultaneously; substantially as described.

14. In apparatus for rolling tubes, the combination of a plurality of parallel rods leading from the passes of the rolls, a stripper having a cross-head connected to said rods and adapted to withdraw them simultaneously, a yoke through which the rods pass, and means for holding the cross-head to the yoke, substantially as described.

15. In apparatus for rolling tubes the combination of a plurality of parallel rods leading from the passes of the rolls, moving mechanism connected with said rods and adapted to withdraw them simultaneously, a yoke through which the rods pass, and means connected with the yoke and arranged to hold the rods in advanced position, said yoke being tied to the roll-housings; substantially as described.

16. In apparatus for rolling tubes, the combination of a withdrawable rod for receiving the tube from the rolls, means for withdrawing the rod while the tube remains in the place in which it is delivered by the rolls, and a conveyer having one end located below the stripped tube, for transferring the tube longitudinally to the receiving side of the rolls; substantially as described.

17. In apparatus for rolling tubes the combination of a rod for receiving the tube from the rolls, a stripper, a conveyer for idly transferring the tube longitudinally to the receiving side of the rolls, and transfer mechanism on the receiving side for transferring the tube to the proper pass of the rolls; substantially as described.

18. In apparatus for rolling tubing, the combination with rolls, of a rod for receiving the tube from the rolls, a stripper and a conveyer extending under the rolls for idly transferring the tube longitudinally to the receiving side of the rolls; substantially as described.

19. In apparatus for rolling tubing, the combination of a rod for receiving the tube from the rolls, a stripper, a conveyer extending under the rolls for transferring the tube longitudinally to the receiving side of the rolls, and a lifting transfer mechanism on the receiving side of the rolls; substantially as described.

20. In apparatus for rolling tubes, in combination with rolls, a mandrel, means for initially projecting the mandrel to a point beyond its working position on the receiving side of the rolls, and for permitting its backward yielding movement to its working position, substantially as described.

21. In apparatus for rolling tubes, the combination with rolls, of a mandrel and means for yieldingly holding the mandrel projected beyond its working position on the receiving side of the rolls; substantially as described.

22. The combination with rolls, of a lifting-table movable upwardly and laterally and arranged to automatically aline the piece to be rolled with a pass of the rolls, and a pusher moving with the table; substantially as described.

23. A table, a lifting-frame on which it is laterally movable and laterally-movable guiding-fingers; substantially as described.

24. A table, a lifting-frame on which it is laterally movable, laterally-movable guiding-fingers, and conveying mechanism between the lower portions of the fingers; substantially as described.

25. In tube-rolling apparatus the combination of a rod, means for retracting it, a lifting-table, and simultaneously-actuated mechanisms for moving the rod and table; substantially as described.

26. In tube-rolling apparatus the combination of a rod, means for retracting it, a lifting-table, simultaneously-actuated mechanism for moving the rod and table, a stop for the rod, simultaneously-actuated mechanism for retracting the rod and releasing the stop; substantially as described.

27. In apparatus for rolling tubes the combination of a rod for receiving the tube from the rolls, means for retracting and projecting the rod, a yoke through which the rod passes, and a swinging hook-stop on the yoke adapted to hold the rod; substantially as described.

28. In apparatus for rolling tubes the combination of a rod for receiving the tube from the rolls, means for retracting and projecting the rod, a swinging hook-stop arranged to automatically engage the rod, and hand-controlled mechanism for releasing the stop from the rod; substantially as described.

29. The combination with rolls, of a lifting-table, a pusher moving with the table and arranged to act lengthwise of the table, and mechanism for alining the pusher with a pass of the rolls; substantially as described.

30. The combination with rolls, of a lifting-table arranged to automatically aline the piece to be rolled with a pass of the rolls, a pusher moving with the table and means for alining the pusher with a roll-pass; substantially as described.

31. A table, a lifting-frame on which it is laterally movable, means for automatically alining the piece to be rolled with a pass and adjusting mechanism arranged to adjust the alining means for different passes; substantially as described.

32. The combination with rolls, of a table, a lifting-frame on which it is laterally movable, a pusher moving with the table, means for automatically alining the pusher with a pass of the rolls, and means for adjusting the alining means for different passes; substantially as described.

33. A table, a lifting-frame on which it is laterally movable, a pusher moving with the table, mechanism for automatically alining both the pusher and the piece to be rolled with a pass of the rolls, and means for adjusting the alining mechanism for different passes; substantially as described.

34. The combination with rolls, of a lifting-table, a pusher movable therewith, and actuating connections arranged to shift the pusher to different distances from the rolls; substantially as described.

35. The combination with rolls, of a support arranged to aline the metal with a pass of the rolls, means for adjusting the support to bring it in alinement with different passes, a lower conveyer, and means for lowering the support into alinement with the conveyer irrespective of its adjusted upper position; substantially as described.

36. In apparatus for rolling tubes, the combination with rolls, of a lifting-table arranged to be brought into alinement with the different passes of the rolls, means for adjusting the table to aline it with the different passes, a lower conveyer arranged to receive the tube, and means for lowering the table into alinement with the conveyer to deposit the tube thereon, irrespective of the upper position of said table; substantially as described.

37. The combination with rolls having a series of passes, of a feeding-table, mechanism for moving said table laterally into line with the respective roll-passes, and a pusher and its actuating mechanism therefor carried by the table; substantially as described.

In testimony whereof we have hereunto set our hands.

MALCOLM WIKSTROM.
ALONZO C. MORSE.

Witnesses:
EDWIN MANSFIELD,
B. T. LONG.